(12) United States Patent
Hiriyur et al.

(10) Patent No.: US 8,375,652 B2
(45) Date of Patent: Feb. 19, 2013

(54) MOMENT FRAME CONNECTOR

(75) Inventors: Badri Hiriyur, Mountain House, CA (US); Steven E. Pryor, Dublin, CA (US)

(73) Assignee: Simpson Strong-Tie Company, Inc., Pleasanton, CA (US)

(*) Notice: Subject to any disclaimer, the term of this patent is extended or adjusted under 35 U.S.C. 154(b) by 0 days.

(21) Appl. No.: 13/081,410

(22) Filed: Apr. 6, 2011

(65) Prior Publication Data

US 2011/0179725 A1   Jul. 28, 2011

Related U.S. Application Data (62) Division of application No. 11/959,696, filed on Dec. 19, 2007, now abandoned.

(60) Provisional application No. 60/871,587, filed on Dec. 22, 2006.

(51) Int. Cl.
*E04B 1/98* (2006.01)

(52) U.S. Cl. ............... 52/167.3; 52/655.1; 52/656.9; 52/657; 403/2

(58) Field of Classification Search ........... 52/655.1, 52/656.9, 657, 167.3, 167.8; 403/2
See application file for complete search history.

(56) References Cited

U.S. PATENT DOCUMENTS

| | | | | |
|---|---|---|---|---|
| 1,744,600 A * | 1/1930 | Wilcox | 403/230 |
| 3,173,522 A * | 3/1965 | Zimmer et al. | 403/337 |
| 3,674,289 A * | 7/1972 | Geraci | 403/189 |
| 3,716,957 A * | 2/1973 | Bernardi | 52/633 |
| 3,716,959 A * | 2/1973 | Bernardi | 52/838 |
| 3,828,516 A * | 8/1974 | Kern | 403/250 |
| 3,901,613 A * | 8/1975 | Andersson | 403/178 |
| 3,915,579 A * | 10/1975 | Offenbroich | 403/264 |
| 4,175,555 A * | 11/1979 | Herbert | 606/304 |
| 4,192,621 A * | 3/1980 | Barth | 403/15 |
| 4,326,826 A * | 4/1982 | Bunyan | 411/339 |
| 4,447,217 A * | 5/1984 | Blandford | 464/32 |
| 4,463,753 A * | 8/1984 | Gustilo | 606/308 |
| 5,019,079 A * | 5/1991 | Ross | 606/312 |
| 5,048,243 A * | 9/1991 | Ward | 52/167.4 |
| 5,242,239 A * | 9/1993 | Hosokawa | 403/258 |
| 5,490,356 A * | 2/1996 | Kemeny | 52/167.7 |
| 5,536,127 A * | 7/1996 | Pennig | 411/413 |
| 5,595,040 A | 1/1997 | Chen | |
| 5,660,017 A | 8/1997 | Houghton | |

(Continued)

FOREIGN PATENT DOCUMENTS

| JP | 04008945 A * | 1/1992 |
| JP | 10306498 A | 11/1998 |

(Continued)

OTHER PUBLICATIONS

Office Action dated Oct. 5, 2010, U.S. Appl. No. 11/959,696.

(Continued)

*Primary Examiner* — Robert Canfield
*Assistant Examiner* — Charissa Ahmad
(74) *Attorney, Agent, or Firm* — Vierra Magen Marcus & DeNiro LLP (57) ABSTRACT

A lateral bracing system is disclosed for affixing a column to a beam in a construction. The lateral bracing system includes a pair of buckling restraint blocks, one each affixed to a top and bottom flange of a beam. Each buckling restraint block includes one or more bores formed through a center of the block. The lateral bracing system further includes at least one yield link for each buckling restraint block. Each yield link includes a first end affixed to the column, and a second end fit through a bore in a buckling restraint block and affixed to an end of the buckling restraint block.

18 Claims, 6 Drawing Sheets

U.S. PATENT DOCUMENTS

| | | | |
|---|---|---|---|
| 5,727,358 A * | 3/1998 | Hayashi et al. | 52/745.2 |
| 5,797,228 A * | 8/1998 | Kemeny | 52/167.7 |
| 5,956,916 A | 9/1999 | Liss | |
| 5,970,679 A * | 10/1999 | Amore | 52/846 |
| 6,007,267 A * | 12/1999 | VanHorn | 403/2 |
| 6,030,162 A * | 2/2000 | Huebner | 411/413 |
| 6,059,482 A | 5/2000 | Beauvoir | |
| 6,073,405 A | 6/2000 | Kasai et al. | |
| 6,112,486 A | 9/2000 | Ashton et al. | |
| 6,138,427 A | 10/2000 | Houghton | |
| 6,220,410 B1 * | 4/2001 | Robinson | 188/371 |
| 6,474,902 B1 * | 11/2002 | Beauvoir | 403/403 |
| 6,516,583 B1 | 2/2003 | Houghton | |
| 6,591,573 B2 * | 7/2003 | Houghton | 52/656.9 |
| 6,739,099 B2 | 5/2004 | Takeuchi et al. | |
| 7,178,296 B2 * | 2/2007 | Houghton | 52/261 |
| 7,497,054 B2 | 3/2009 | Takeuchi et al. | |
| 7,757,441 B1 | 7/2010 | Whittaker | |
| 7,874,120 B2 | 1/2011 | Ohata et al. | |
| 8,146,322 B2 | 4/2012 | Karns | |
| 2002/0184836 A1 | 12/2002 | Takeuchi et al. | |
| 2003/0009977 A1 | 1/2003 | Houghton | |
| 2003/0230032 A1 * | 12/2003 | Shahnazarian et al. | 52/167.3 |
| 2004/0187430 A1 | 9/2004 | Takeuchi et al. | |
| 2004/0244330 A1 | 12/2004 | Takeuchi et al. | |
| 2005/0166487 A1 | 8/2005 | Tsai | |
| 2005/0257451 A1 | 11/2005 | Pryor et al. | |
| 2005/0257490 A1 | 11/2005 | Pryor et al. | |
| 2006/0144006 A1 | 7/2006 | Suzuki et al. | |
| 2011/0232221 A1 | 9/2011 | Tsai et al. | |

FOREIGN PATENT DOCUMENTS

| | | |
|---|---|---|
| JP | 2000027293 A | 1/2000 |
| JP | 2004278293 A | 10/2004 |
| JP | 2005042375 A | 2/2005 |
| JP | 2005213964 A | 8/2005 |
| JP | 2005350906 A | 12/2005 |
| JP | 2007016449 | 1/2007 |
| JP | 2007032802 A * | 2/2007 |

OTHER PUBLICATIONS

Response to Office Action filed Nov. 5, 2010, U.S. Appl. No. 11/959,696.
Office Action dated Dec. 6, 2010, U.S. Appl. No. 11/959,696.
Office Action dated Nov. 8, 2010, Chinese Application No. 200710301531.4.
Office Action dated Feb. 1, 2011 in European Application No. 07255025.4.
U.S. Appl. No. 12/967,462, filed Dec. 14, 2010.
Response to Office Action filed Mar. 9, 2011 in Chinese Application No. 200710301531.4.
Extended European Search Report dated May 12, 2011 in European Application No. 07255025.4.
Office Action dated Feb. 23, 2012 in U.S. Appl. No. 12/967,462.
Response to Office Action filed Mar. 23, 2012 in U.S. Appl. No. 12/967,462.
Response to Office Action filed Mar. 31, 2012 in Chinese Patent Application No. 200710301531.4.
Response to Office Action filed Apr. 4, 2012 in European Patent Application No. 07255025.4.
Office Action dated Apr. 11, 2012 in U.S. Appl. No. 12/967,462.
Office Action dated Nov. 16, 2011 in Chinese Application No. 200710301531.4.
Response to Office Action filed Jul. 11, 2012 in U.S. Appl. No. 12/967,462.
Final Office Action dated Aug. 16, 2012 in U.S. Appl. No. 12/967,462.
Office Action dated Jul. 17, 2012 in Japanese Patent Application No. 2007-341933.
Swedish Search Report cited in Turkish Patent Application No. 2011/12457 on Aug. 16, 2012.

* cited by examiner

MOMENT FRAME CONNECTOR

CROSS REFERENCE TO RELATED APPLICATION

The present application is a divisional of U.S. patent application Ser. No. 11/959,696, entitled "Moment Frame Connector", filed Dec. 19, 2007, currently pending, which application claims priority to U.S. Provisional Patent Application No. 60/871,587, entitled "Moment Frame Connector", filed Dec. 22, 2006, which application is incorporated herein by reference in its entirety.

BACKGROUND OF THE INVENTION

1. Field of the Invention

The present invention relates to hysteretic damping for structures used in light-framed constructions, and in particular to a lateral bracing system constructed to provide a high degree of energy dissipation through hysteretic damping along with high initial stiffness so that energy is dissipated at low force thresholds within a light-framed construction.

2. Description of the Related Art

Shear stresses due to natural phenomena such as seismic activity and high winds can have devastating effects on the structural integrity of light-framed constructions. Lateral forces generated during such natural phenomena may cause the top portion of a wall to move laterally with respect to the bottom portion of the wall, which movement can result in damage or structural failure of the wall and, in some instances, collapse of the building.

In constructions such as residences and small buildings, lateral bracing systems were developed to counteract the potentially devastating effects of shear stress on the structural integrity of light-framed constructions. Although various designs are known, one type of lateral bracing system includes vertical studs spaced from each other and horizontal beams affixed to and extending between the studs. The beams are affixed to the studs in a manner aimed at increasing structural performance of the connection under lateral loads.

Many conventional lateral bracing systems perform well initially under lateral loads, but yield and fail upon the repetitive lateral loads which often occur during significant seismic activity and high winds. Upon appreciable yield or failure of the lateral bracing system, the entire system must be replaced.

Another consideration unrelated to loading of structures is the ease and effectiveness with which such structures may be erected by crews at a worksite. One task which adds to the time, complexity and cost of constructions is having to weld components together at the worksite. Bolted connections are typically preferred, in that they may be accomplished more quickly, effectively and without the additional equipment and labor costs associated with welding.

SUMMARY

Embodiments of the present invention, roughly described, relate to a lateral bracing system for affixing a column to a beam in a construction. In embodiments, the lateral bracing system includes a pair of buckling restraint blocks, one each welded to a top and bottom flange of a beam. Each buckling restraint block includes one or more bores formed through a center of the block. The lateral bracing system further includes at least one yield link for each buckling restraint block. Each yield link includes a first end affixed to the column, and a second end fit through a bore in a buckling restraint block and affixed to an end of the buckling restraint block.

The lateral bracing system has sufficient stiffness and rigidity to provide a high degree of resistance to deflection under applied lateral loads. However, at lateral loads above a controllable and predictable level, the structure of the present invention provides for stable yielding of the yield links. In this way, the applied lateral loads are hysteretically dampened from the system, and a high degree of energy is dissipated, thereby preventing damage to the frame. Moreover, the energy dissipation and stable yielding of the yield links allow the frame to withstand repeated deflection under lateral loads without failure.

In embodiments, a beam may be delivered to the worksite having the buckling restraint blocks welded, glued or otherwise affixed thereto. Once at the worksite, the yield links may be inserted into the bores in the buckling restraint blocks and affixed to the buckling restraint blocks and columns. Thus, minimal fabrication of the lateral bracing system of the present invention is required at the worksite.

DETAILED DESCRIPTION

The present invention will now be described with reference to FIGS. 1 through 13, which in embodiments of the invention relate to a lateral bracing system having high initial stiffness and including yield links capable of effectively dissipating energy generated within the lateral bracing system under lateral loads. It is understood that the present invention may be embodied in many different forms and should not be construed as being limited to the embodiments set forth herein. Rather these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

Figure 1:
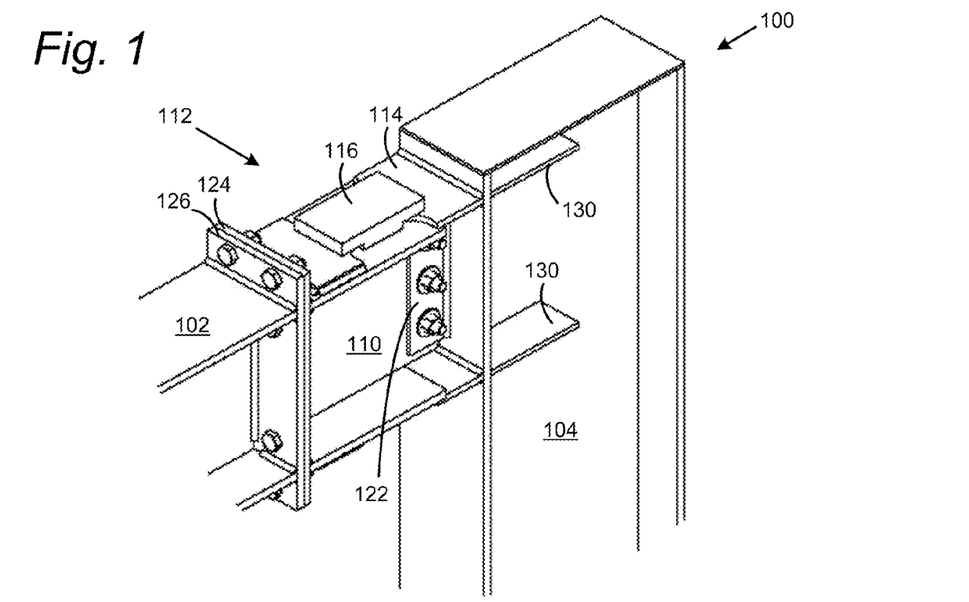
FIG. 1 is a perspective view of a beam connected to a column by a lateral bracing system according to an embodiment of the present invention.
Figure 2:
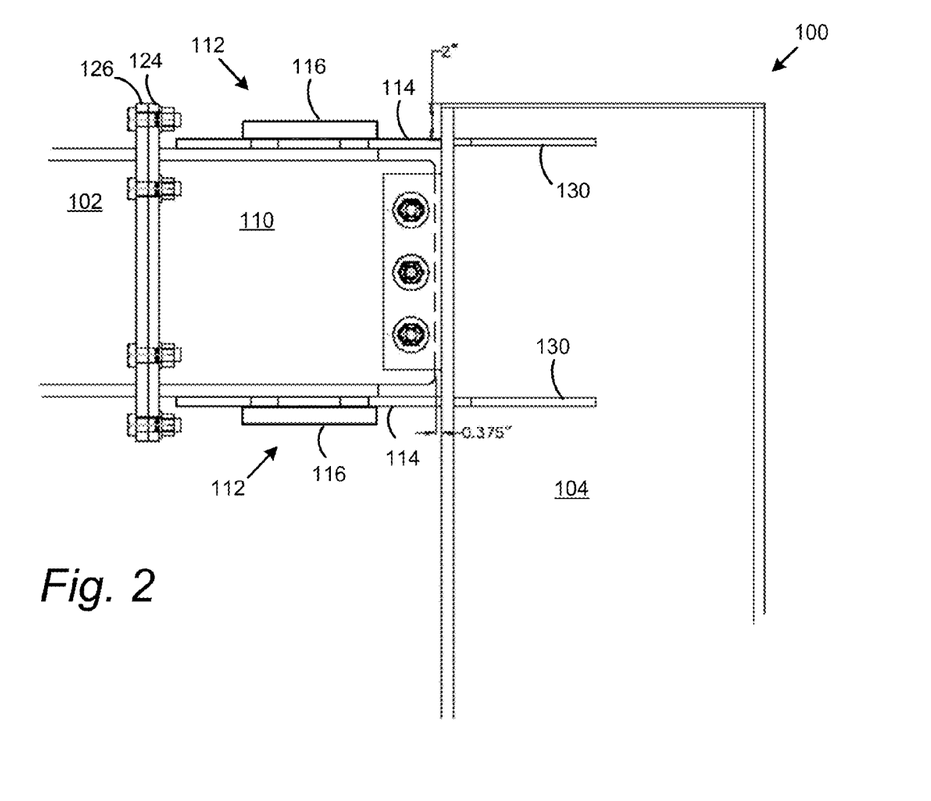
FIG. 2 is a front view of the lateral bracing system according to FIG. 1.
Figure 3:
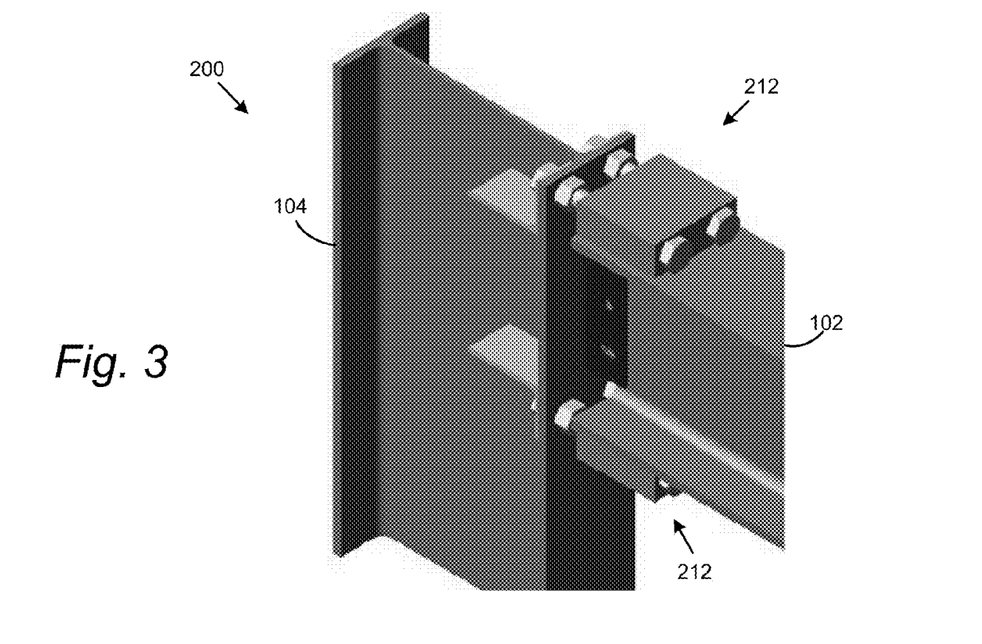
FIGS. 3-5 are perspective views of a beam connected to a column by a lateral bracing system according to a further embodiment of the present invention.
Figure 4:
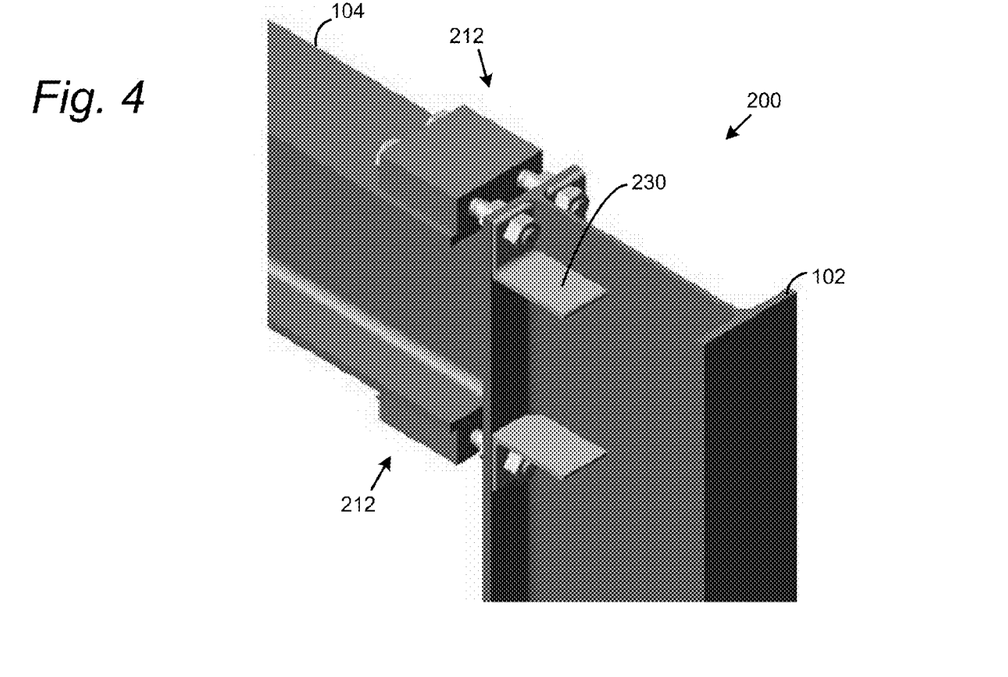
Figure 5:
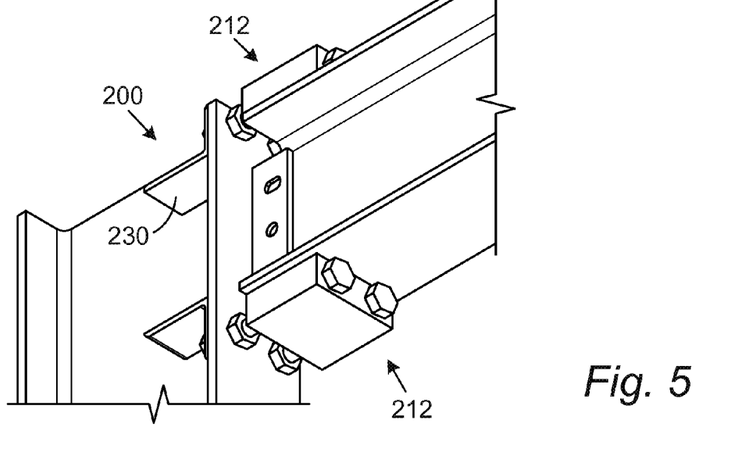
Figure 6:
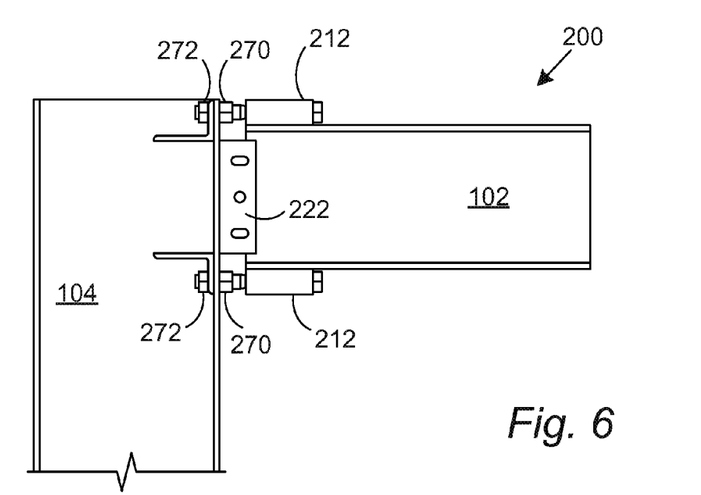
FIG. 6 is a front view of the lateral bracing system shown in FIGS. 3-5.
Figure 7:
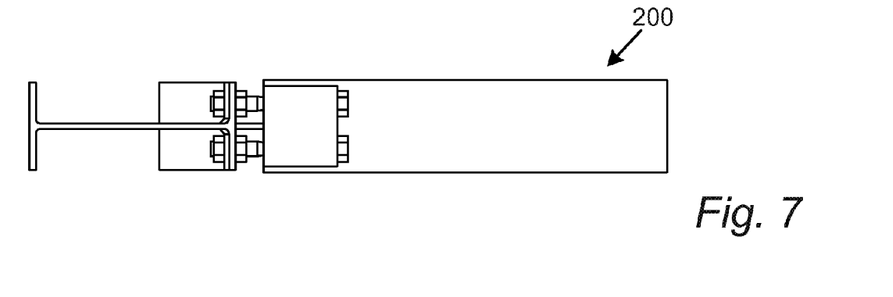
FIG. 7 is a top view of the lateral bracing system shown in FIGS. 3-5.

Referring now to FIGS. 1 and 2, there is shown a frame 100 comprised in part of a horizontal beam 102 affixed to a vertical column 104. Each of the beam 102 and column 104 includes an opposed pair of flanges connected by a central diaphragm. Although referred to as a vertical column and a horizontal beam, it is understood that the column and beam may be affixed to each other at angles other than 90° in alternative embodiments. The beam 102 is affixed to the column 104 by means of a beam stub 110 including a lateral bracing system. The lateral bracing system is comprised of a pair of buckling-restrained braced devices 112, one on each of the top and bottom flanges of beam stub 110. Each buckling-restrained braced device 112 includes a flat, "dog-bone" shaped yield link 114 welded or glued at its first end to a flange of the beam stub 110 and welded or glued at its second end to a flange of the column 104 ("dog bone" shaped in that it is narrower at a center portion than at its end portions). Covering the center portion of each yield link 114 is a buckling restraint block 116. Blocks 116 are welded or glued to the respective flanges of the beam stub 110.

A shear tab 122 may further be provided between the beam stub 110 and column 104. The shear tab 122 may be affixed as by welding, gluing or bolting to a flange of column 104 and as by welding, gluing or bolting to the central diaphragm of beam stub 110. The beam stub 110 additionally includes an end plate 124 welded at an end of the beam stub opposite shear tab 122. End plate 124 may be bolted to a similar end plate 126 to affix the beam 102 to the beam stub 110 as explained hereinafter.

In operation, the pair of buckling-restrained braced devices 112 operate in tandem to oppose rotation of the beam relative to the column (i.e., rotation about the shear tab 122) under a lateral load. Attempted rotation in a first direction will place the first of the devices 112 in tension and the second of the devices in compression. Attempted rotation in the opposite direction will place the first of the devices in compression and the second in tension.

The yield link 114 of the respective devices 112 provides high initial stiffness and tensile resistance to relative movement between the column 104 and the beam 102 under lateral loads, but provides stable yielding and energy dissipation under lateral loads above a predictable and controlled level. In particular, the bending strength of the column and beam could be designed to exceed the moment capacity of the yield links 114, and in particular, the thinner center portions of yield links 114. Thus, the yield links 114 yield under lateral loads before yielding or failure of the column or beam, and any damage is limited to the yield links which may be easily removed and replaced. The buckling restraint blocks 116 prevent buckling of the yield links under a compressive load. The shear tab 122 is provided to oppose vertical shear (i.e., along the length of column 104) under a vertical load.

Moreover, the lateral bracing system provided between beam 102 and column 104 as described with respect to the above and below embodiments allows the omission of the lateral-torsional buckling restraint system conventionally provided as part of the beam. That is, in prior art systems, a lateral-torsional buckling restraint system was provided as part of the beam to yield in the event of excessive lateral loads. These lateral-torsional buckling restraint systems include a yield link and lateral braces to prevent buckling of the beam. Through the use of the lateral bracing system according to the present invention, the lateral-torsional buckling restraint system found on the beam in the prior art may be omitted. Having the ability to control, via a finite cap to the link moment capacity, the input demands on the beam through the lateral bracing system of the present invention, that is separate from the beam itself, allows the beam to be designed without bracing. It also allows the beams and columns to be designed to remain elastic at the level of ultimate yield-link connection moment capacity.

Upon lateral loads, the yield links 114 exert forces on the flange of the column 104 to which the yield links are attached. Accordingly, continuity plates 130 may optionally be affixed to the affected flange of column 104 to oppose the forces exerted by the yield links.

As explained in the Background section, it is desirable to avoid welding at the worksite. Accordingly, in embodiments, the assembly and connection of beam 102 and column 104 may be accomplished as follows. Prior to arriving at the worksite, the first end of the yield links 114 and the buckling-restraint blocks 116 may be welded or glued to the beam stub 110. The end plate 124 may also be welded or glued to the stub 110.

The beam stub 110 may then be welded or glued to column 104 by welding/gluing the second end of the yield links 114 to the flange of column 104, and welding/gluing the shear tab to the diaphragm of column 104. The shear tab may then be bolted to the diaphragm of the beam stub 110. The joined beam stub 110 and column 104 may then be delivered to the worksite. The inclusion of beam stub 110 allows all welding/gluing to take place before the column arrives at the worksite. The end plate 126 may be welded or glued to the beam 102 and the beam may then be delivered to the worksite. Once at the worksite, the beam 102 may be affixed to the beam stub 110 by bolting the end plates 124 and 126 together.

An alternative embodiment of the present invention is now explained with respect to FIGS. 3 through 12. In this embodiment a lateral bracing system is provided which allows the omission of the beam stub 110 and provides a simpler yet effective design. Referring initially to FIGS. 3 through 7, a frame 200 is comprised in part of a horizontal beam 102 affixed to a vertical column 104. Although referred to as a vertical column and a horizontal beam, it is understood that the column and beam may be affixed to each other at angles other than 90° in alternative embodiments.

The beam 102 is affixed to the column 104 by means of a lateral bracing system. The lateral bracing system is comprised of a pair of buckling-restrained braced devices 212, one on each of the top and bottom flanges of beam 102. Each buckling-restrained braced device 212 includes one or more cylindrical yield links 214, each including threads at its ends as explained hereinafter. Each set of one or more yield links 214 may be provided within a buckling restraint block 216 which is welded, glued or otherwise affixed to the upper and lower flanges of beam 102.

A shear tab 222 may further be provided between the beam 102 and column 104. The shear tab 122 may be affixed as by welding, gluing or bolting to a flange of column 104 and as by welding, gluing or bolting to the central diaphragm of beam 102. Column flange stiffeners 230 may optionally be affixed to the flange of column 104 to oppose the forces exerted by the yield links.

Figure 8:
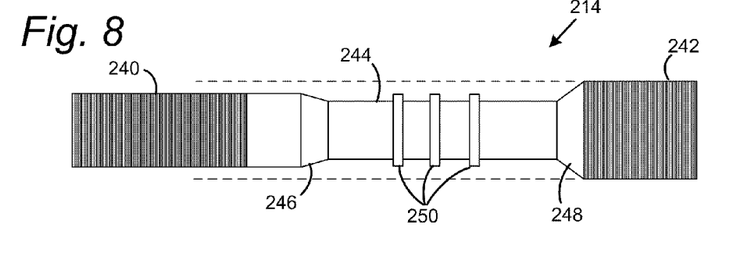
FIG. 8 is a side view of a yield link of the lateral bracing system shown in FIGS. 3-5.
Figure 9:
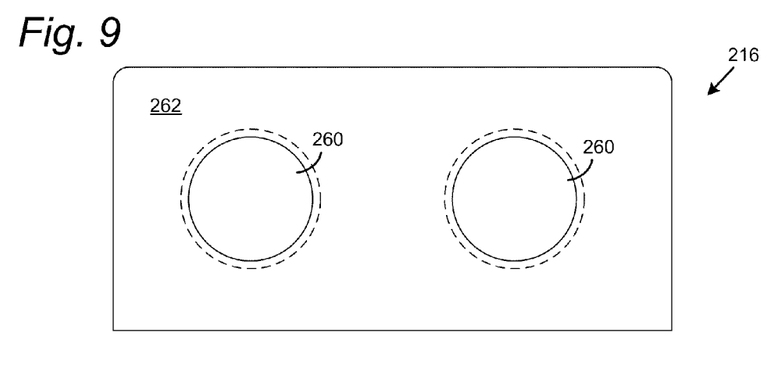
FIG. 9 is an end view of a buckling restraint block of the lateral bracing system shown in FIGS. 3-5.
Figure 10:
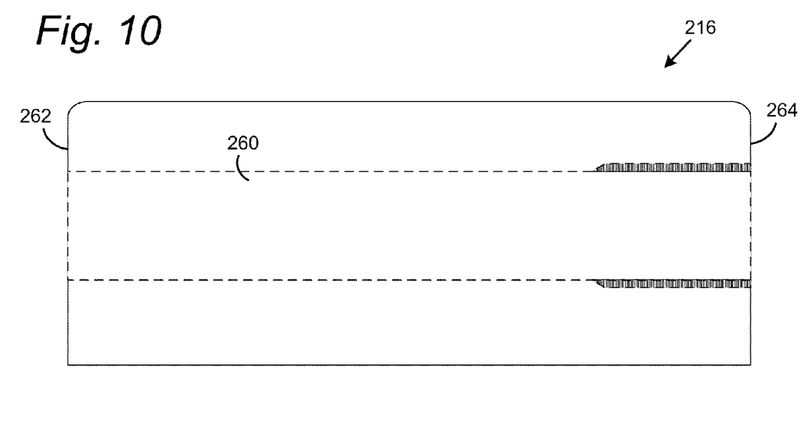
FIG. 10 is a side view of a buckling restraint block of the lateral bracing system shown in FIGS. 3-5.
Figure 11:
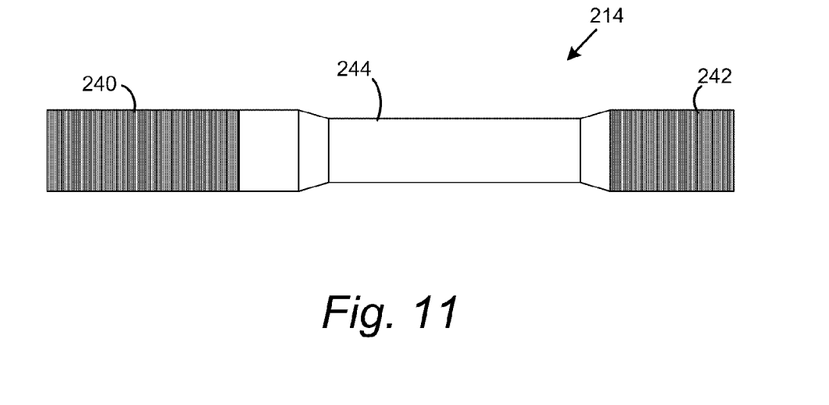
FIG. 11 is a side view of a yield link according to an alternative embodiment of the present invention.

FIG. 8 shows a side view of an embodiment of a cylindrical yield link 214 and FIGS. 9 and 10 show end and side views, respectively, of an embodiment of a buckling restraint block 216. Cylindrical yield link 214 may be formed of steel and includes first and second threaded ends 240, 242, and a center portion 244 between ends 240 and 242. Center portion 244 preferably has a smaller diameter than ends 240, 242 so that, upon yielding as explained hereinafter, the yield link 214 yields at center portion 244. Tapered sections 246 and 248 may be provided to smoothly transition from the diameter of ends 240, 242 to center portion 244. Although not shown, ends 240 and 242 may be chamfered to allow easy insertion into the buckling restraint block 216. Center portion 244 may include ribs 250, the purpose of which is explained hereinafter. It may be possible to form center portion 244 of a different material than ends 240 and 242, where the center portion has a lower modulus of elasticity. In such an embodiment, the center portion may be provided with the same diameter as end 240, and still be the first portion to yield upon tensile stresses above the center portion yield point.

In the embodiment of FIG. 8, the end 242 may have a larger diameter than end 240. As one example, end 242 may have a diameter of 1.30 inches, end 240 may have a diameter of 1.25 inches, and center portion 244 may have a diameter of 1.00 inch, except at ribs 250, which may have a diameter of 1.25 inches. It is understood that each of the above dimensions may vary above and below that set forth, either proportionately or disproportionately to each other, in alternative embodiments.

Buckling restraint block 216 may be a block of metal such as aluminum or steel with one or more bores 260 formed therethrough for receiving the one or more yield links 214. Bores 260 may have a diameter which is approximately the same as the diameter of ribs 250 and/or end 240, with the end 264 being slightly larger to receive threaded end 242 of yield links 214. The length (along the length of beam 102) of block 216 may for example be 6.50 inches, the width (across the width of the flanges of beam 102) may be approximately equal to or slightly less than the width of the flanges of beam 102, such as for example 7.00 inches, and the block 216 may have a height of 2.50 inches. When block 216 includes a pair of bores 260, the bores may be spaced from each other 4.00 inches, centerline to centerline. It is understood that each of these dimensions may vary, either proportionately or disproportionately to each other, in alternative embodiments.

The block 216 may include an end 262, through which end 240 of yield link 214 protrudes when the device 112 is assembled as explained below, and an end 264 opposite end 262. A portion of bores 260 may be threaded adjacent end 264, for receiving threaded end 242 of the yield link as explained below.

Beam 102 may be delivered to the worksite having block 216 welded, glued or otherwise affixed thereto. Column may be delivered to the worksite having shear tab 222 welded, glued or otherwise affixed thereto. Referring now to FIGS. 6 through 10, once at the worksite, yield links 214 may be inserted into bores 260, with end 240 of yield link 214 inserted first into end 264 of block 216 (i.e., right to left from the perspective of FIGS. 6 and 7). The smaller diameter portions 240, 244 and 250 of the yield link pass through the larger diameter bore 260 until threaded yield link end 242 engages the threaded end of the bore. At that point, end 242 may be threaded into block end 264 to affix the yield link 214 to the buckling restraint block 216. The end 242 of yield link 214 may include a head to drive the link into the block, but the head may be omitted in alternative embodiments.

For each yield link 214, the link is screwed in until link end 240 protrudes from block end 262. As seen for example in FIG. 6, a nut 270 is then threaded onto link end 240, the end 240 passes through a hole formed in the flange of column 104, and a second nut 272 is threaded onto end 240. Once nuts 270 and 272 are tightened down on opposed sides of the column flange, the buckling-restrained braced device 212 is fixed in position to oppose movement between beam 102 and column 104.

In particular, the pair of buckling-restrained braced devices 212 operate in tandem to oppose rotation of the beam 102 relative to the column 104 under a lateral load. The yield link 214 of the respective devices 212 provides high initial stiffness and tensile resistance to relative movement between the column 104 and the beam 102 under lateral loads, but provides stable yielding at center portion 244 and energy dissipation under lateral loads above a predictable and controlled level. In particular, bending strength of the column and beam could be designed to exceed the moment capacity of portions 244 of yield links 214. Thus, the yield links 214 yield under lateral loads before yielding or failure of the column or beam, and any damage is limited to the yield links which may be easily removed and replaced.

The buckling-restraint blocks 216 prevent buckling of the yield links under a compressive load. In particular, the relative diameter of bore 260 to the diameter of the center portion 244 of the yield links 214 limits the amount which the yield links may buckle. As set forth above, the center portion 244 may include ribs 250. The enlarged diameter of ribs 250 further limit the amount to which the yield links 214 may buckle within bore 260 of buckling restraint block 216. In embodiments, there may be three ribs 250, but there may be one, two or more than three in alternative embodiments. In further embodiments, ribs 250 may be omitted altogether.

Figure 12:
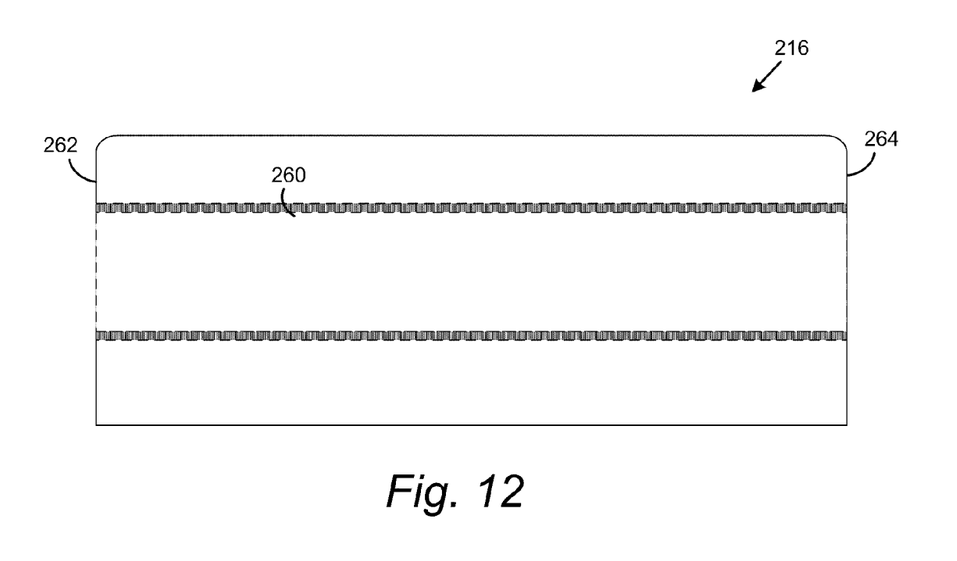
FIG. 12 is a side view of a buckling restraint block according to an alternative embodiment of the present invention.

In the embodiments described with respect to FIGS. 8 through 10, the link end 242 has a greater diameter than link end 240, thereby allowing the yield link to pass freely through the buckling restraint block 216 until engagement of the threads in link end 242 and block end 264. In the alternative embodiments of FIG. 11, the yield link 214 has ends 240 and 242 with equal diameters, for example 1.25 inches. In such embodiments, the block 216 may have a bore 260 threaded along its entire length as shown in FIG. 12. The embodiment of FIGS. 11 and 12 may operate with or without ribs in the smaller diameter center portion.

In accordance with the embodiments of the present invention described above with respect to FIGS. 1-12, the lateral bracing system has sufficient stiffness and rigidity to provide a high degree of resistance to deflection under applied lateral loads. However, at lateral loads above a controllable and predictable level, the structure of the present invention provides for stable yielding of the yield links. In this way, the applied lateral loads are hysteretically dampened from the system, and a high degree of energy is dissipated, thereby preventing damage to the frame. Moreover, the energy dissipation and stable yielding of the yield links allow the frame 100 to withstand repeated deflection under lateral loads without failure.

In the event the links are damaged upon yielding, the lateral bracing system may be restored to its virgin integrity and load bearing capabilities simply by removing and replacing the yield links. The structural frame remains intact and need not be replaced.

Figure 13:
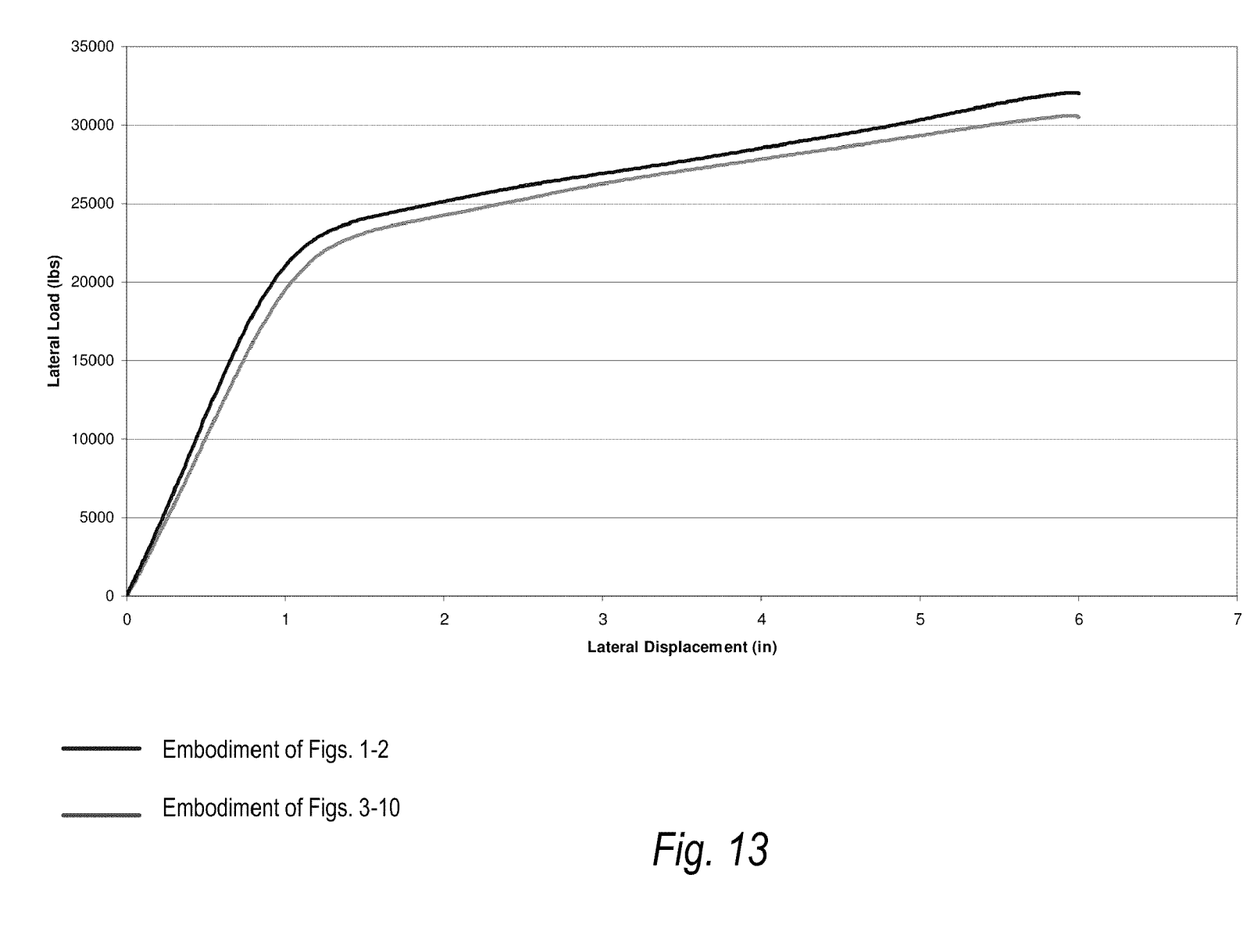
FIG. 13 is a graph of lateral load vs. lateral displacement of the frame for embodiments of the present invention.

FIG. 13 is a plot of the response of an embodiment of the buckling-restrained braced device 112 of FIGS. 1 through 2 and an embodiment of the buckling-restrained braced device 212 of FIGS. 3 through 10 for applied lateral loads. As seen, both embodiments perform elastically until their yield point at about 22,000 lbs. lateral load.

Although the invention has been described in detail herein, it should be understood that the invention is not limited to the embodiments herein disclosed. Various changes, substitutions and modifications may be made thereto by those skilled in the art without departing from the spirit or scope of the invention as described and defined by the appended claims.

What is claimed is:

1. A construction including a beam and a column, the construction comprising:
   a buckling restraint block capable of being affixed to an end of the beam, the buckling restraint block including a first end nearest the end of the beam when the block is affixed to the beam, a second end opposite the first end and a bore between the first and second ends; and
   a yield link including a first end capable of being affixed to the column, and a second end fit through the bore in the buckling restraint block and capable of being affixed to the second end of the buckling restraint block, the yield link having a length over which forces act to allow the yield link to yield in tension and compression to dissipate stress within the frame upon a lateral load applied to the beam and/or column, and wherein the yield link includes a middle section having a lower strength than the first and second ends, the yield link yielding at the middle section upon a given tensile force.

2. A construction as recited in claim 1, wherein the second end of the yield link is threaded to mate with threads on the second end of the buckling restraint block.

3. A construction as recited in claim 1, wherein the middle section has a smaller diameter than the first and second ends.

4. A construction as recited in claim 1, further comprising one or more ribs of larger diameter in a middle section of the yield link, the one or more ribs opposing buckling of the yield link by coming into contact with walls of the buckling restraint block defining the bore.

5. A construction as recited in claim 4, wherein the one or more ribs comprise three ribs.

6. A construction as recited in claim 1, wherein the second end of the yield link has a larger diameter than the first end of the yield link.

7. A construction, comprising:
   a column;
   a beam;
   a shear tab affixed between the column and beam; and
   a lateral bracing system affixed between the column and beam, including:
      a pair of buckling restraint blocks, one each on a top and bottom flange of the beam, each buckling restraint block including a first end affixed to an end of the beam, a second end opposite the first end and at least one bore between the first and second ends; and
      a pair of yield links, each yield link including a first end affixed to the column, and a second end fit through the bore in one of the buckling restraint blocks and affixed to the second end of one of the buckling restraint blocks, a yield link of the pair of yield links provided for a purpose of yielding in tension and compression to dissipate stress within the frame upon a lateral load applied to the beam and/or column, and wherein each yield link includes a middle section having a smaller diameter than the first and second ends.

8. A construction as recited in claim 7, wherein each buckling restraint block includes a pair of parallel bores.

9. A construction as recited in claim 8, wherein each bore in a buckling restraint block includes yield link therethrough.

10. A construction as recited in claim 7, wherein the second end of each yield link is threaded to mate with threads on the second end of each buckling restraint block.

11. A construction as recited in claim 7, further comprising one or more ribs of larger diameter in a middle section of each yield link, the one or more ribs opposing buckling of the yield link by coming into contact with walls of the buckling restraint block defining the bore.

12. A construction as recited in claim 11, wherein the one or more ribs comprise three ribs.

13. A construction including a beam and a column, the construction comprising:
   a buckling restraint block affixable to an end of the beam, the buckling restraint block including a first end nearest the end of the beam when the block is affixed to the beam, a second end opposite the first end and a cylindrical bore between the first and second ends; and
   a cylindrical yield link extending through the bore and including a first end affixable to the column, and a second end affixable to the second end of the buckling restraint block, the yield link capable of yielding in tension and compression to dissipate stress within the frame upon a lateral load applied to the beam and/or column, and wherein the yield link includes a middle section having a lower strength than the first and second ends, the yield link yielding at the middle section upon a given tensile force.

14. A construction as recited in claim 13, wherein the second end of the yield link is threaded to mate with threads on the second end of the buckling restraint block.

15. A construction as recited in claim 13, wherein the second end of the yield link has a head having a larger diameter than the bore, the head fastened against the second end of the buckling restraint block outside of the bore.

16. A construction as recited in claim 13, wherein the middle section has a smaller diameter than the first and second ends.

17. A construction as recited in claim 13, further comprising one or more ribs of larger diameter in a middle section of the yield link, the one or more ribs opposing buckling of the yield link by coming into contact with walls of the buckling restraint block defining the bore.

18. A construction as recited in claim 13, wherein the second end of the yield link has a larger diameter than the first end of the yield link.

* * * * *